(No Model.) 6 Sheets—Sheet 1.

W. C. WOOD.
STREET RAILWAY SPECIAL WORK.

No. 511,831. Patented Jan. 2, 1894.

Witnesses

Inventor
William Clark Wood
by _____
Attorney.

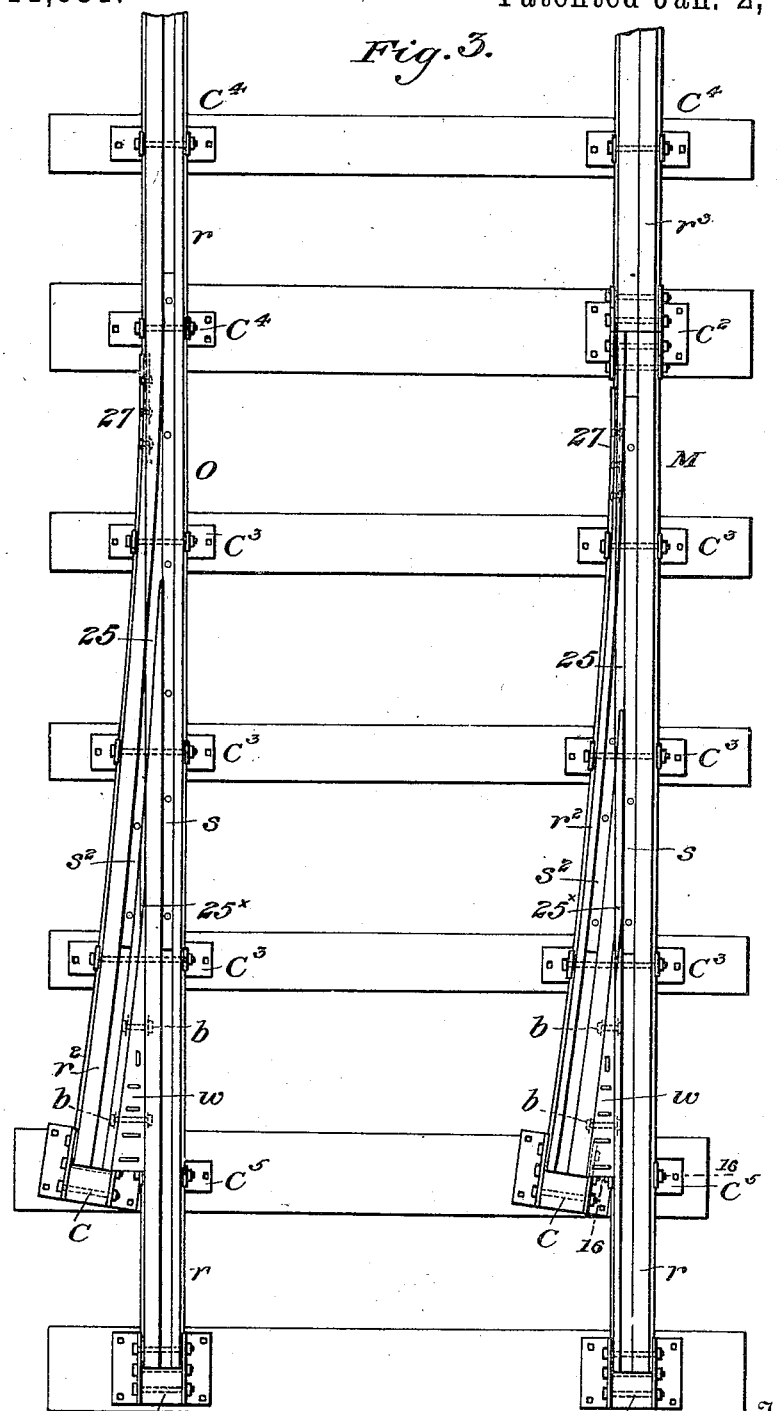

(No Model.) 6 Sheets—Sheet 3.
W. C. WOOD.
STREET RAILWAY SPECIAL WORK.
No. 511,831. Patented Jan. 2, 1894.
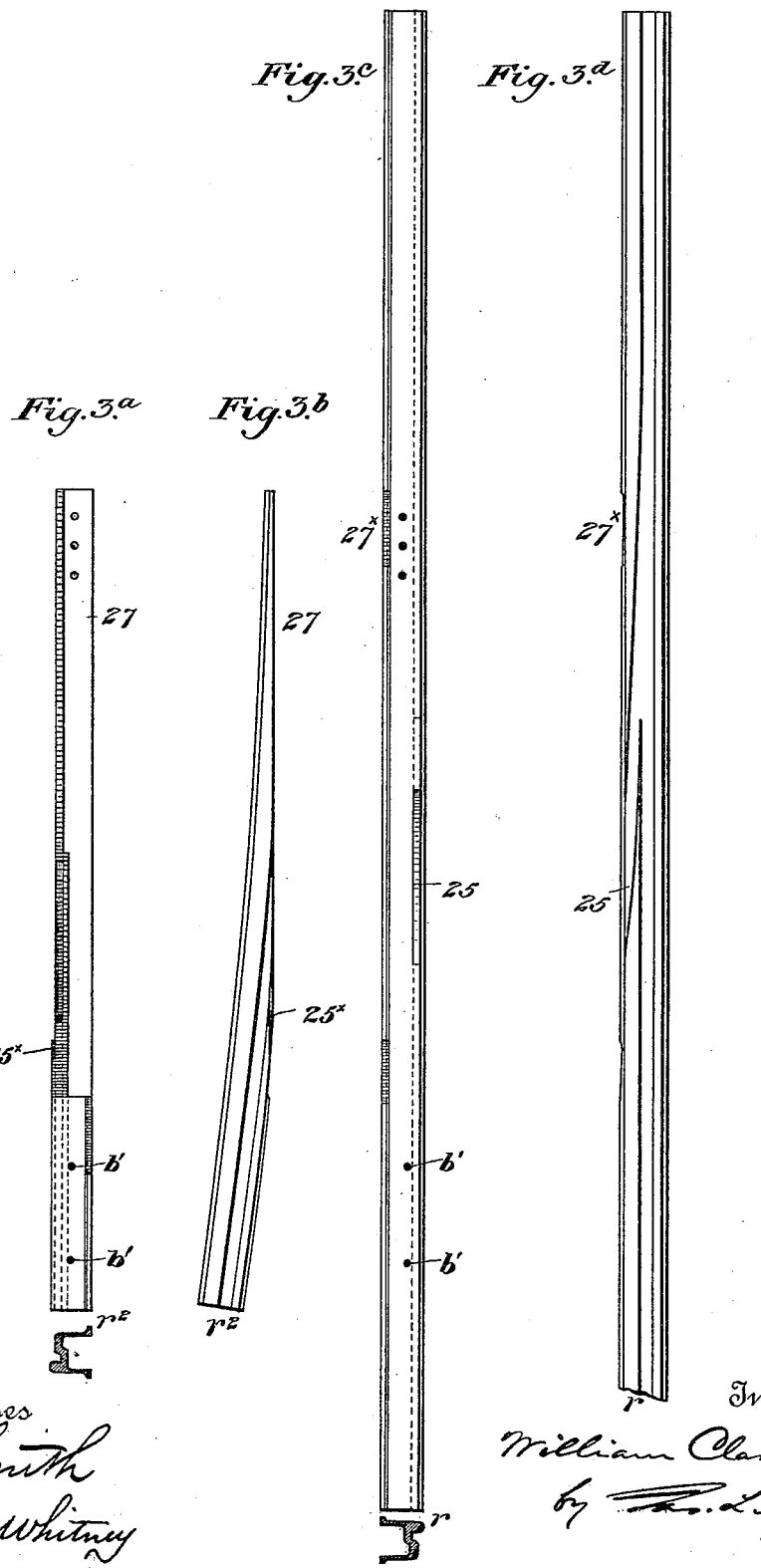
Witnesses
C. W. Smith
Geo. M. Whitney
Inventor
William Clark Wood
by Thos. L. Ewing
Attorney.

(No Model.)  6 Sheets—Sheet 4.
W. C. WOOD.
STREET RAILWAY SPECIAL WORK.
No. 511,831. Patented Jan. 2, 1894.
Fig.3.<sup>e</sup> Fig.3.<sup>f</sup> Fig.3.<sup>g</sup> Fig.3.<sup>h</sup>
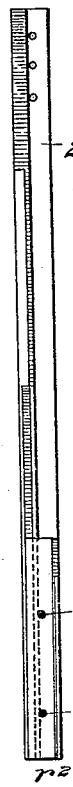
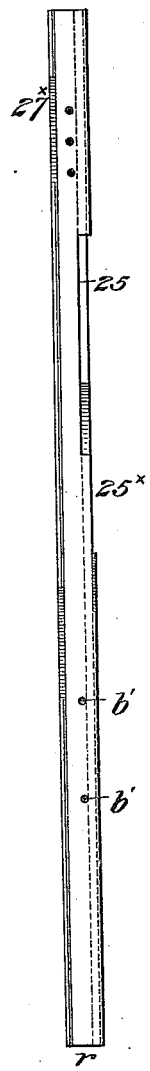
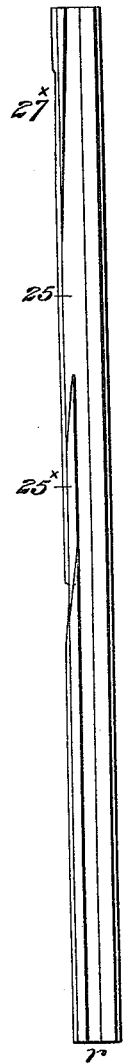
Witnesses
C. W. Smith
Geo. M. Whitney
Inventor
William Clark Wood
by Th. L. Ewin.
Attorney (No Model.) 6 Sheets—Sheet 5.

W. C. WOOD.
STREET RAILWAY SPECIAL WORK.

No. 511,831. Patented Jan. 2, 1894.

Witnesses
Inventor
William Clark Wood
Attorney.

(No Model.) 6 Sheets—Sheet 6.
W. C. WOOD.
STREET RAILWAY SPECIAL WORK.
No. 511,831. Patented Jan. 2, 1894.
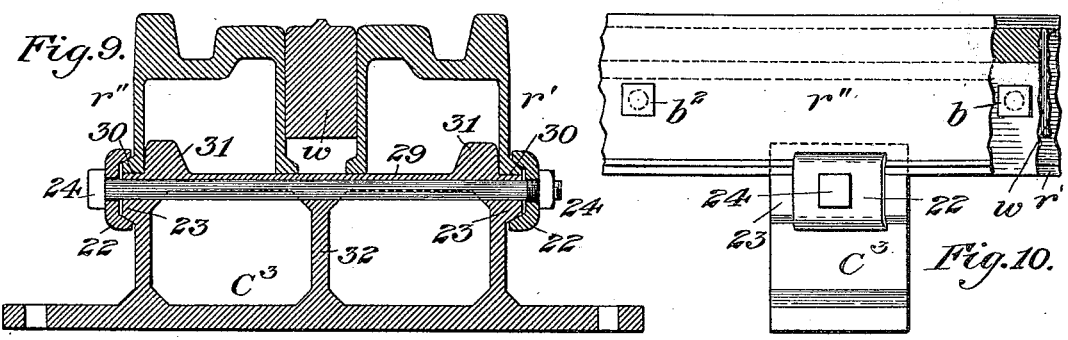
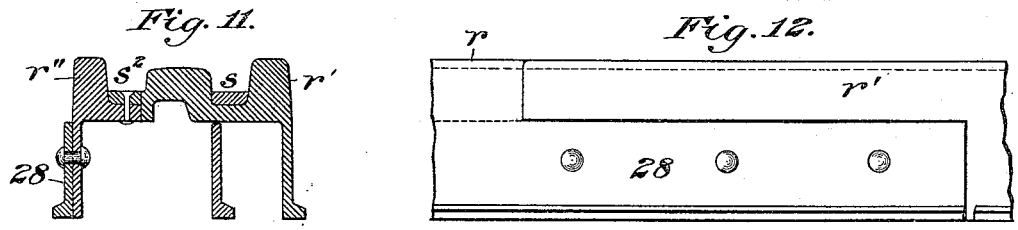
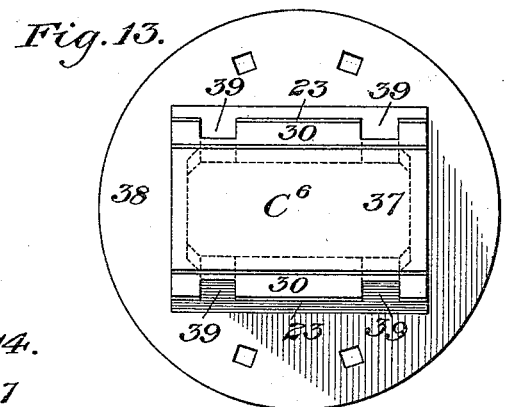
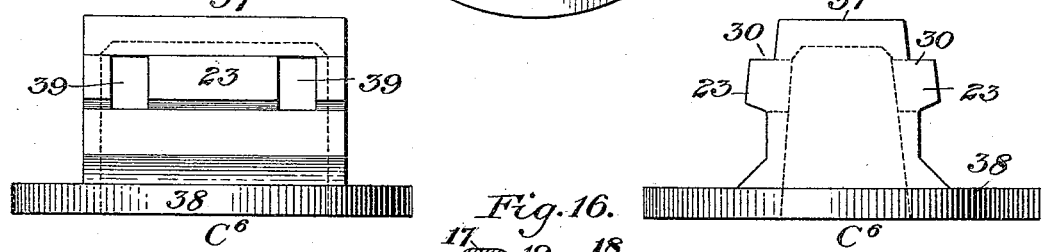
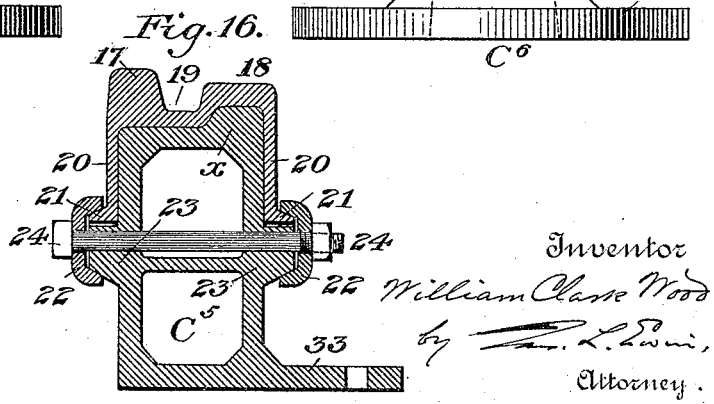
Witnesses
Inventor
William Clarke Wood
Attorney

UNITED STATES PATENT OFFICE.

WILLIAM CLARK WOOD, OF BROOKLYN, NEW YORK, ASSIGNOR TO THE LEWIS & FOWLER GIRDER-RAIL COMPANY, OF SAME PLACE.

STREET-RAILWAY SPECIAL WORK.

SPECIFICATION forming part of Letters Patent No. 511,831, dated January 2, 1894.

Application filed April 8, 1893. Serial No. 469,562. (No model.)

*To all whom it may concern:*

Be it known that I, WILLIAM CLARK WOOD, a citizen of the United States of America, and a resident of Brooklyn, in the State of New York, have invented a new and useful Improvement in Street-Railway Special Work, of which the following is a specification.

The term "special work" as herein employed is confined to frogs in general, open-points, and mates in each of which an individual rail-tread or track-groove is crossed, entered or left by one or more, usually one other, tread or groove at a more or less oblique angle, and all parts of the same are rigidly united with each other; and the term "piece" means an individual frog, open-point or mate.

The present invention does not include what are distinctively known in the art as "crossings," in which two or more tracks substantially at right angles are carried or extended across each other at grade by a structure common to all. An improvement in such crossings constitutes the subject-matter of a companion specification forming part of an application for patent filed by me March 31, 1893, Serial No. 468,446.

Figure 1:
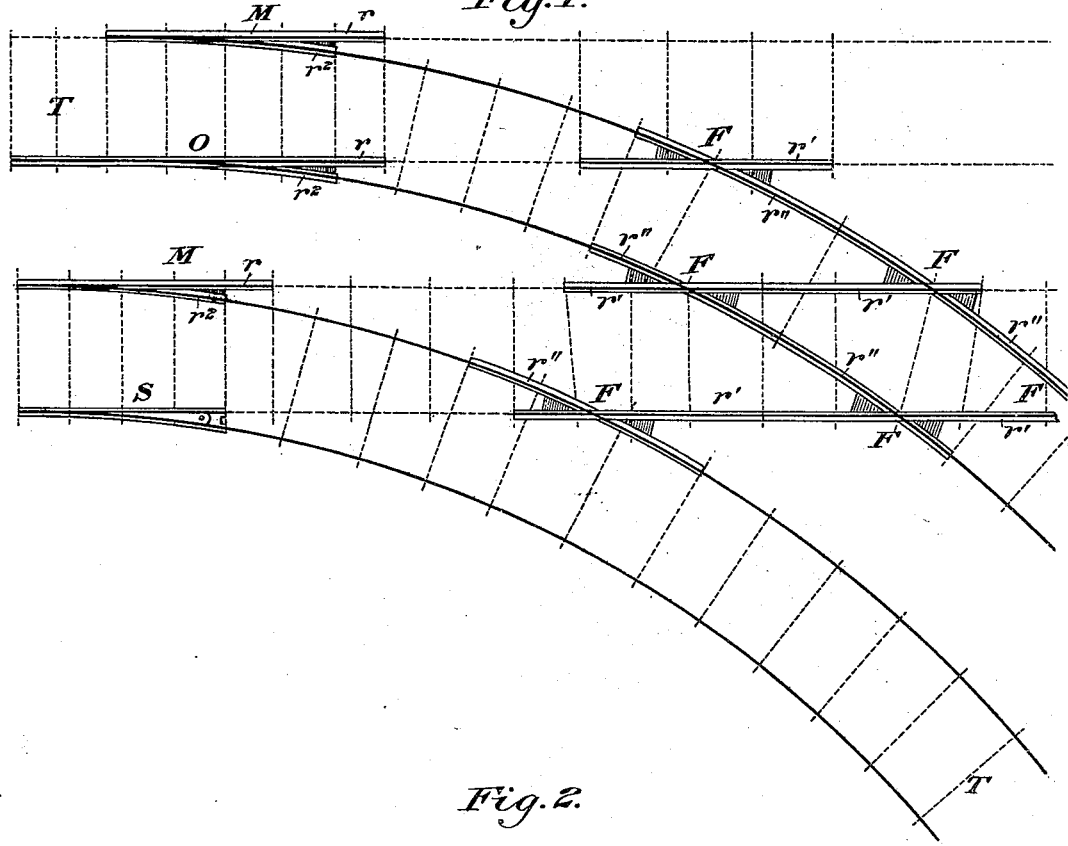

The present invention consists primarily in a frog or other piece of such special work constructed of box girder-rail, such rail being preferably of the section known as "Section C," represented by Figure 1 of my drawings forming part of United States Patent No. 443,470, dated December 23, 1890, and of the peculiar construction set forth and claimed in said patent.

The invention further consists in certain novel combinations of parts, in a frog or other piece of such special work, all of which may be found in an improved frog of the construction as a whole hereinafter set forth.

The objects of the invention are to render such special work at once light in proportion to the required stiffness and strength, and of symmetrical and efficient forms; to reinforce the crotch or crotches, and at the same time to fill the same up to convenient paving widths; to adapt special chairs to be readily fitted to each piece of special work at bottom, and at the same time to be clamped to its rails in the manner set forth and claimed in my specification forming part of Patent No. 450,594, dated April 14, 1891, as regards the coaction of the elastic webs of the box-rail and its laterally projecting flanges with wedging clamps, and of such clamp with chair-projections and clamping bolts below the rail; to preserve the angle or angles of the crotch or crotches of a piece of such special work so clamped; and to further provide for meeting the peculiar requirements of frogs in special work of this construction, as hereinafter more fully set forth.

Six sheets of drawings accompany this specification as part thereof.

Figure 2:
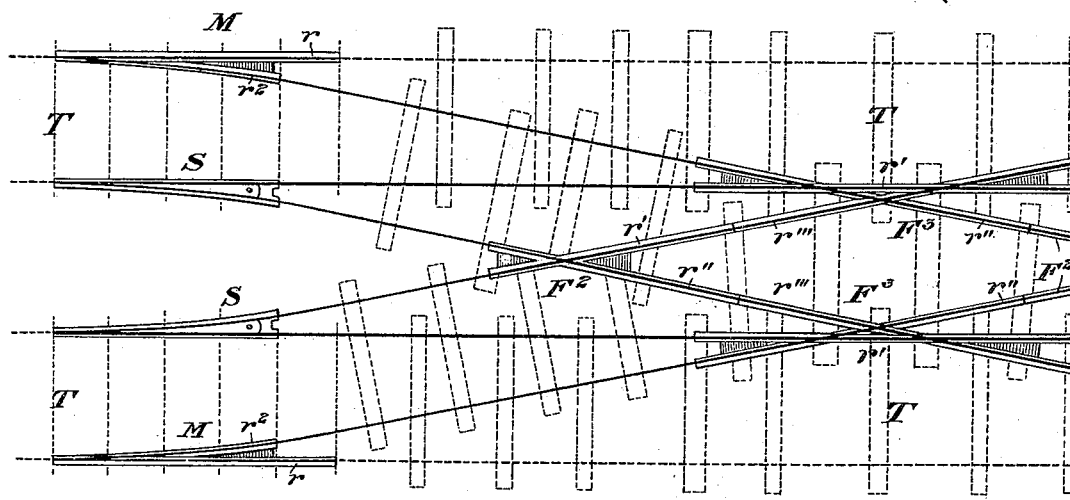
Figure 4:
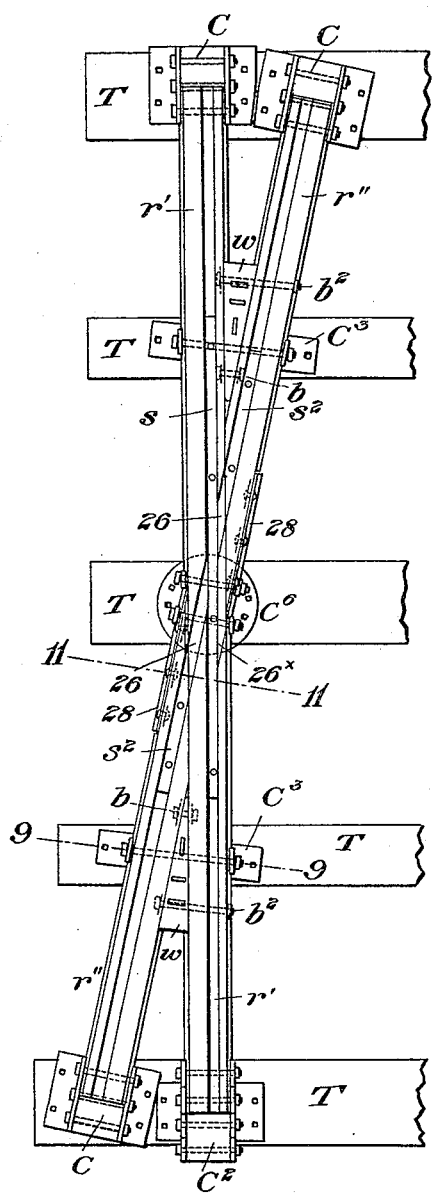
Figures 5, 6, 7, 8:
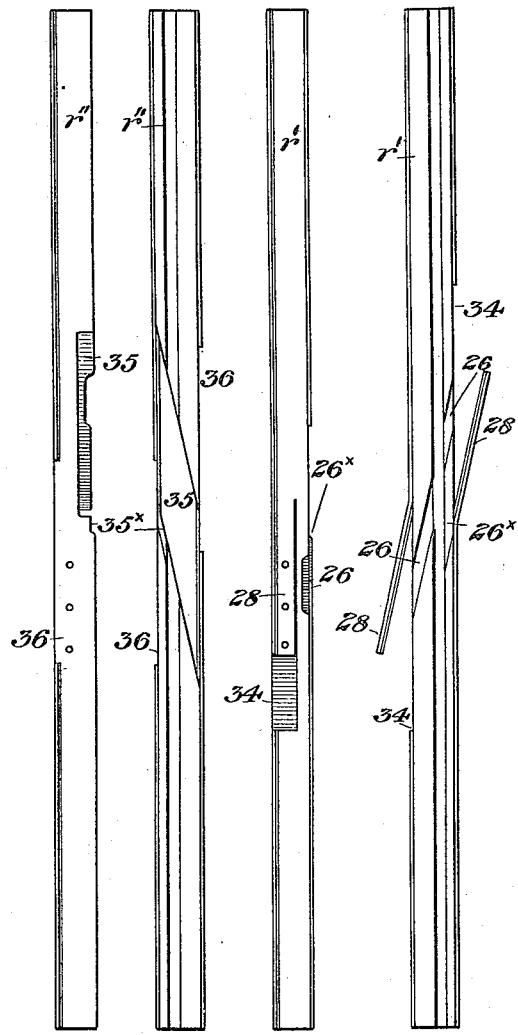

Figs. 1 and 2 of these drawings are diagrammatic plan views of portions of street-railway tracks, illustrating the special work to which the present invention relates. Fig. 3 is a plan view enlarged from Fig. 1 of the open point and mate shown at the upper left-hand corner of Fig. 1. Figs. $3^a$, $3^b$, $3^c$ and $3^d$ are detail views of the rails of an "open-point," O Fig. 3, Fig. $3^a$ showing the cut side of the lateral rail with an appended cross-section, Fig. $3^b$ a plan view of said lateral rail, Fig. $3^c$ the cut side of the through rail with an appended cross-section, and Fig. $3^d$ a plan view of said through rail. Figs. $3^e$, $3^f$, $3^g$ and $3^h$ are like detail views of the respective rails of a "mate," M Fig. 3. Figs. 4 to 8 are detail views of a characteristic frog on the same scale as Fig. 3, Fig. 4 being a plan view of the frog, Figs. 5 and 6 respectively side and top views of its "under rail," and Figs. 7 and 8 respectively side and top views of its "top rail." Fig. 9 represents a cross-section on the line 9—9 Fig. 4, showing one of the "intermediate chairs," this and the succeeding figures being enlarged three diameters from Figs. 3 and 4. Fig. 10 is a fragmentary elevation projected from Fig. 9. Fig. 11 represents a cross-section on the line 11—11 Fig. 4. Fig. 12 is a fragmentary elevation projected from Fig. 11. Fig. 13 is a plan view of the special frog-chair shown at the groove-intersection in Fig. 4. Figs. 14 and 15 are side and end views of this chair, Fig. 13; and Fig. 16 represents a section through a "crotch-chair" for open-points and mates, on the line 16—16 Fig. 3.

Like letters and numbers refer to like parts in all the figures.

In Figs. 1 and 2, F $F^2$ and $F^3$ represent frogs of different kinds; O represents an open-point, and M M M represent mates, to which the present invention is confined as above. S S S represent tongue switches which may be of any ordinary or improved construction or constructions. The dotted lines and outlines at T and like lines and outlines represent cross-ties as arranged to support the special work; the other dotted lines represent rails which may in practice be the running rails of the respective tracks; and the full lines connecting and leading from said pieces of special work represent rails which are preferably of the same section as those of said pieces, as hereinafter set forth. All the various pieces of such special work are preferably constructed mainly that is to say as regards their rail-portions of box girder-rail of one and the same section, viz: said "section C," and are so shown in the accompanying drawings. Referring to Fig. 16, it may here be pointed out that such section C rail comprises a high guard 17 opposed to the tread 18 of the rail so as to form a deep and well-guarded groove 19, and has when uncut a pair of elastic webs 20 flaring downwardly, in the unclamped rail and provided at bottom with laterally projecting flanges 21 beveled on top; said flanges, in the figure, as in said patented clamping system, engaging with wedging clamps 22, which in turn engage with lateral chair-projections 23 opposed to the rail-flanges; each pair of said clamps being drawn toward each other, and the elastic webs of the rail sprung inward to vertical planes, by a horizontal through-bolt 24, or two or more such bolts, below the rail. The special-work construction common to such frogs F F² F³, Figs. 1 and 2, and to such open-points O and mates M, is illustrated by Figs. 3 to 16 inclusive, and may be described as follows: Each piece is composed of at least two "rails" $r\ r^2$ or $r'\ r''$, one of which, $r$ or $r'$, has or may have a top which is continuous excepting a shallow intersection notch or notches, 25 25× or 26 26×; and the two rails are connected with each other at their intersection by means of a flap or flaps 27 or 28 of the web-metal of one of the rails, attached by rivets to the adjoining web of the other rail. Within each crotch, a wedge $w$, preferably of cast-iron, is inserted above the rail flanges, with its roughened top-surface flush with the rail-treads; and the rails are united at each crotch by horizontal bolts $b\ b^2$, extending through the inner webs or through the inner webs and one outer web of the respective rails, and through the wedge, so as to support the latter, and at the same time draw the rails tightly against the sides. Each wedge is made long enough to fill the crotch to a convenient paving width.

To provide if desired for carrying the cars across the intersections on the wheel-flanges, the rail-grooves in common are partly filled by means of filling-up strips $s$ and $s^2$, which are riveted fast through the top of the rail, as in Fig. 11. Finally, a "joint-chair" C or a "compromise" joint-chair C² is clamped to each rail-end of the piece of special work, and a sufficient number of "intermediate chairs," C³ with or without supplemental single chairs C⁴, are clamped thereto at proper points, to rest on cross-ties T, to which they are spiked in customary manner to fasten the piece in its working position. Said joint-chairs C and said single chairs C⁴ are in practice steel chairs of substantially the construction shown in Figs. 1 to 3 of my drawings, and set forth and claimed in my specification, forming part of Patent No. 459,717, dated September 15, 1891.

The compromise chairs C² have chair-castings fitted at one end to the section C rail and at the other end to rails of other sections, and may be of the construction set forth and claimed in my specification forming part of Patent No. 461,090, dated October 13, 1891, or, as represented in the drawings, may be fitted at their outer ends to a different weight or section $r^3$, Fig. 3, of my box-rails, as for example the section known as "Section B," represented by Fig. 1 of my drawings forming part of said Patent No. 450,594, or the section known as "Section D" and represented by Fig. 2 of my drawings forming part of said Patent No. 443,470.

The distinguishing characteristic of the present compromise chair, C², is its provision with a distinct pair of said clamps, 22 Fig. 16, for each of its four bolts, so that any pair may be tightened without affecting the others; and a feature common to all the joint-chairs C C² is the support of each box-rail immediately beneath its head, as set forth in said Patent No. 450,594, and as represented by the rail-seat $x$ in Fig. 16.

The "intermediate chairs" C³, common to two converging or diverging rails, throughout the special work, are all substantially of the peculiar construction shown as C³ in Figs. 9 and 10; that is to say each chair has at top a flat surface 29 at midwidth to engage with the sole or soles of the inner web or webs of the united rails; square shoulders 30 to engage with the outermost rail-webs of the piece in like manner, and vertical projections 31 to engage internally with said outermost webs; and in the wider chairs a central upright 32 supports the floor of the chair at midwidth. In addition to these peculiar features, each of said intermediate chairs, in common with the other chairs, has clamp-engaging projections 23 beveled at bottom, and is provided with clamps 22 and through-bolts 24 as before described with reference to Fig. 16; said shoulders 30 being formed by the tops of said projections 23. An open point O or a mate M of this construction, as illustrated in common by said Figs. 3 and 16, is composed of a through-rail $r$ Figs. 3ᶜ and 3ᵈ or Figs. 3ᵍ and 3ʰ of a suitable length, which may be the full length of a section of rail, a short lateral rail $r^2$, Figs. 3ᵃ and 3ᵇ or Figs. 3ᵉ and 3ᶠ, a joint-chair C or a compromise joint-chair C² as above at each of the three rail-ends, a sufficient number of intermediate chairs $C^3$, and, in the case of open points, of supplemental single chairs $C^4$, as above, and a crotch-chair $C^5$, (Fig. 16,) supporting the through rail $r$ at the end of the lateral rail $r^2$, where an ordinary chair would interfere with the joint-chair at the outer end of said lateral rail, together with a complement of clamps and bolts, 22 24 Fig. 16, as indicated in Fig. 3; the peculiarity of said crotch-chair being a base 33 Fig. 16 projecting at the outer side only. Said through-rail $r$ has one of its said flanges, 21 Fig. 16, cut away from the web which adjoins the lateral rail $r^2$, where the two come in contact as shown at $27^\times$ Figs. $3^c$, $3^d$, $3^g$ and $3^h$. The lateral rail $r^2$ is cut off at the proper angle for the intersection; terminating in a rail-web flap 27, which is attached to the adjoining web of the other rail by rivets. The crotch between the rails is filled flush with their treads by a wedge $w$ of cast-iron, and the rails are united at this point by short bolts $b$ extending through said wedge and through the adjoining inner webs of the respective rails, as above.

The bolt-holes in the rails are represented at $b'$ in Figs. $3^a$, $3^c$, $3^e$ and $3^g$. The grooves of both rails are provided in Fig. 3 with filling-up strips $s$ and $s^2$ as above; the through-rail $r$ is provided with a notch 25 in line with the groove of the lateral rail, extending downward to the level of said filling-up strips; and, where the guard, 17 Fig. 16, of either rail, is crossed by the line of an intersecting tread, 18 Fig. 16, such guard is notched to the level of the tread, as shown at $25^\times$ in Figs. 3, $3^b$ and $3^g$.

Each of the several frogs shown at F in Fig. 1 has one rail, which may be $r'$ as above, forming part of a straight through track, and a second rail, which may be $r''$ as above, forms part of a turn-out curve; each of those represented at $F^2$ in Fig. 2 is composed of two similar rails $r'$ $r''$, either of which may in practice be $r'$, forming parts of two transfer tracks; and each of the triple frogs represented at $F^3$ in Fig. 2 comprises a rail $r'$ forming part of a through track, crossing a second rail $r''$ and a third rail $r'''$, which in turn cross each other, forming parts of the same transfer-tracks.

A frog of the simple form common to all said frogs F is shown in detail by said Figs. 4 to 15 inclusive, and will now be particularly described: Said rail $r'$ of a frog is termed its "top rail," and is cut away at bottom at the intersection of the rails up to the bottom of the top of the rail as shown at 34, Figs. 7 and 8; the web-metal being detached only at top and at one end on each side of the rail so as to form oppositely projecting flaps 28, which are bent outward at the angle of the frog, shortened if unnecessarily long, and provided with rivet-holes, as shown. The rail $r''$, termed the "under rail," is correspondingly cut away at top to the bottom of the top of the rail, as shown at 35, Figs. 5 and 6, its guard being further cut away to the level of its tread as shown at $35^\times$ so as to clear the tread of the top rail; and its web flanges are removed, as shown at 36, so as to form flat seats for the flaps 28, which are ultimately riveted fast to the rail-webs of the under rail at these points as in Figs. 4, 11 and 12. The crotch-filling wedges $w$, which may next be inserted, coact in the frog with short and long bolts $b$ $b^2$, the latter extending conveniently through a web of each rail at one side of the frog. The filling-up strips $s$ and $s^2$ when these are employed are riveted fast within the grooves of both rails, being continuous in the top rail and in two pieces $s^2$ in the groove of the under rail. Joint chairs C, as above described, are clamped to each rail-end which is to connect with a rail of another piece of the improved special work as in Figs. 1 and 2, or with a curve rail or a rail of like section; a compromise chair $C^2$ on each rail-end which is to connect with a rail of a different section; an intermediate chair $C^3$ at midlength of each wedge, and an intersection chair $C^6$ at the intersection of the two rails. Said intermediate chairs are of the special construction hereinbefore described with reference to Figs. 9 and 10, and the specific intersection chair represented in Fig. 4 is of the special construction shown by Figs. 13 to 15, as regards its chair-casting or the chair proper. This chair is fitted to the under rail $r''$ at bottom by means of a pair of shoulders 30 like those of the intermediate chairs, Fig. 9, separated by an inter-web projection 37; its base 38 is circular to facilitate arranging it with the rail-seat at any required angle, and its clamp-engaging projections 23 are pierced at 39 for two through-bolts 24, which are provided with separate pairs of clamps 22 as in Fig. 4, so as to provide for clamping the frog on both sides of the middle line of the intersection of the rails. In a triple frog $F^3$, Fig. 2, three of said intersection chairs $C^5$ may be used at the intersections of the three rails. The rails $r''$ and $r'''$ are inter-notched where they cross, and one or both of them may be provided with supplemental rail-web flaps as above. After interlocking said rails $r''$ and $r'''$ with each other, the top rail $r'$ is superposed, and the frog is completed in the manner above set forth. The filling-up strips $s$ $s^2$ may be omitted when the rails of the special work are supported and clamped as above. In this case the notches 25 26 in line with the grooves are cut as deep as the grooves, and the wheels run over the intersections on the practically continuous treads of the rails.

Other like modifications will suggest themselves to those skilled in the art.

I hereby disclaim in a frog constructed of box girder-rails, the combination of a top rail continuous at top excepting a shallow intersection notch or notches, with an adjoining rail, the two rails being connected at their intersection by means of the web of one of the rails being detached only at the top and at one end on each side of the rail so as to form oppositely projecting flaps, and being attached to the adjoining web of the other rail; also in such a frog comprising two rails formed with a high guard opposed to the tread of the rail so as to form a deep and well-guarded groove, the combination of a rail continuous at top excepting a shallow intersecting notch or notches, with an adjoining rail, the two rails being connected at their intersection, and filling-up strips secured in the channel or groove of the said rail; as I am not the first inventor of these combinations.

Having thus described the said improvement, I claim as my invention and desire to patent under this specification—

1. In a frog or other piece of street-railway special work constructed mainly of box girder-rail, the combination of a rail continuous at top excepting a shallow intersection-notch or notches, an adjoining rail connected with the rail first named at the intersection, a wedge or wedges interposed between the rails within the crotch or crotches, and horizontal bolts uniting wedge and rails, substantially as hereinbefore specified.

2. The combination, in a frog or other piece of street-railway special work, of united box girder-rails having elastic webs provided with laterally projecting flanges at bottom, special chairs fitted to the piece at bottom and having laterally-projecting flanges opposed to the outermost rail-flanges, wedging clamps embracing said outermost rail-flanges and the chair-flanges, and horizontal through-bolts uniting each pair of clamps below the rail, substantially as hereinbefore specified.

3. The combination, in a frog or other piece of street-railway special work, of united box girder-rails having elastic webs provided with laterally projecting flanges at bottom, a wedge or wedges interposed between the rails within the crotch or crotches of the piece, special chairs fitted to the piece at bottom and having laterally projecting flanges opposed to the outermost rail-flanges, wedging clamps embracing said outermost rail-flanges and the chair-flanges, and horizontal through-bolts uniting each pair of clamps below the rail, substantially as hereinbefore specified.

4. In a street-railway frog constructed mainly of box girder-rail, the combination of a top rail continuous at top excepting shallow notches, but cut away at bottom at the intersection of the rails up to the bottom of the top of the rail, the web-metal being detached only at top and at one end on each side of the rail so as to form oppositely projecting flaps, a bottom rail cut away at top to the bottom of the top of the rail, and united laterally with said flaps, a pair of wedges interposed between the rails within the respective crotches, and horizontal bolts connecting each wedge with both rails, substantially as hereinbefore specified.

5. In a street-railway frog constructed mainly of box girder-rail, the combination of a top rail continuous at top excepting shallow notches but cut away at bottom at the intersection of the rails up to the bottom of the top of the rail, an under rail cut away at top to the bottom of the top of the rail, and a chair fitted to the under rail at bottom beneath the intersection of the rails, substantially as hereinbefore specified.

6. In a street-railway frog constructed mainly of box girder-rail having elastic webs provided with laterally projecting flanges at bottom, the combination of a top rail continuous at top excepting shallow notches but cut away at bottom at the intersection of the rails up to the bottom of the top of the rail, an under rail cut away at top to the bottom of the top of the rail, a chair fitted to the under rail at bottom and having laterally projecting flanges opposed to the outermost rail-flanges of the piece, wedging clamps embracing said outermost flanges and the chair-flanges, and horizontal through-bolts uniting each pair of clamps below the rails, substantially as hereinbefore specified.

7. In a street-railway frog constructed mainly of box girder-rail having elastic webs provided with laterally projecting flanges at bottom, the combination of a top rail continuous at top excepting shallow notches but cut away at bottom at the intersection of the rails up to the bottom of the top of the rail, an under rail cut away at top to the bottom of the top of the rail, a chair fitted to the under rail at bottom and having laterally projecting flanges opposed to the outermost rail-flanges of the piece, wedging clamps embracing said outermost flanges and the chair flanges on both sides of the middle line of the intersection, and horizontal through-bolts uniting each pair of clamps below the rails, substantially as hereinbefore specified.

WILLIAM CLARK WOOD.

Witnesses:
  A. B. WOODWARD,
  WALTER BRYERS.